UNITED STATES PATENT OFFICE 2,284,248

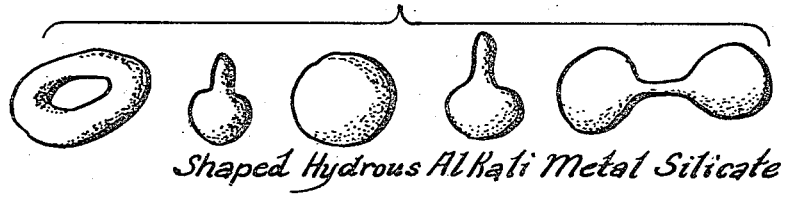
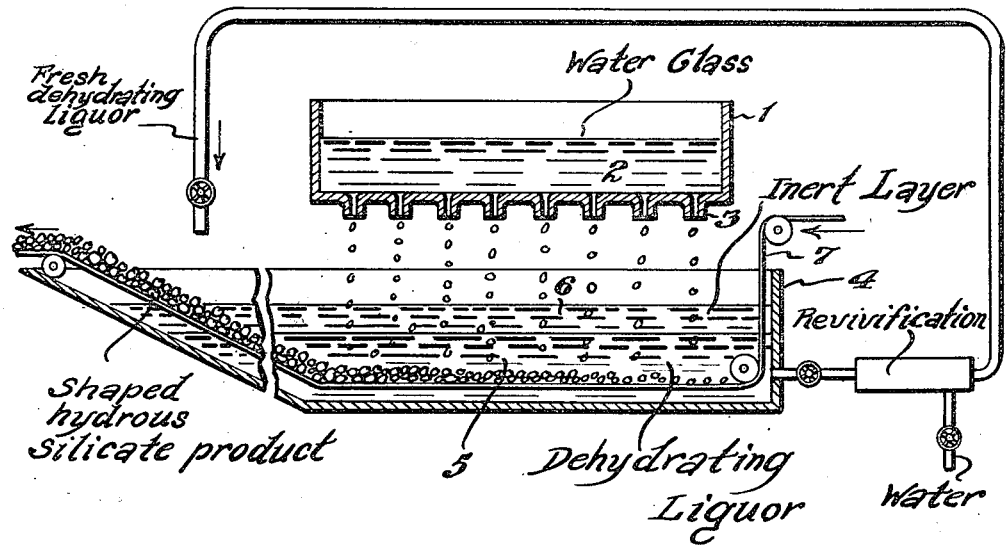

MANUFACTURE OF SHAPED PARTICLES OF HYDROUS ALKALI METAL SILICATES

Chester L. Baker, Penn Wynne, and Charles H. Dedrick, Drexel Hill, Pa., assignors to Philadelphia Quartz Company, Philadelphia, Pa., a corporation of Pennsylvania Application February 16, 1939, Serial No. 256,818

14 Claims. (Cl. 252—135)

This invention relates to manufacture of shaped particles of hydrous alkali metal silicates; and it comprises a method of producing hydrous alkali metal silicates in the form of particles of various predetermined shapes and sizes by the liquid-dehydration of concentrated silicate solutions, said method comprising contacting a body of dehydrating liquid with shaped bodies of a concentrated silicate solution, usually a solution containing at least two molecules of $SiO_2$ to 1 molecule of alkali metal oxide and which may contain a compatible detergent compound in admixture therewith, in such manner that said bodies of silicate solution are dehydrated from their surfaces inwardly usually without substantial change of shape. The invention also includes the products produced by the described process, these products comprising shaped particles of hydrous alkali metal silicates having a superficial outer layer which is less hydrous when the particles are freshly made and which usually has a ratio of alkali metal oxide to silica which is somewhat lower than that in the interior, said particles having true specific gravities ranging from about 1.3 to 2.4 and a weight per cubic foot ranging from about 40 to 110 pounds, usually having shapes corresponding to the shapes assumed by one liquid when distributed in a second immiscible liquid of approximately the same specific gravity and usually having a composition which can be represented by the formula $X_2O \cdot nSiO_2 \cdot mH_2O$, wherein $X_2O$ represents an alkali metal oxide, $n$ may vary from about 2 to 5, and $m$ from about 5 to 20; all as more fully hereinafter set forth and as claimed.

There has long been a demand in the art for cheap alkali metal silicates in quickly-soluble form. In the case of the more alkaline silicates, that is, silicates containing at least one molecule of alkali metal oxide to one molecule of $SiO_2$, this demand has been met with reasonable satisfaction. But in the case of the highly siliceous silicates, which, other things being equal, are more slowly soluble, difficulties have been encountered in producing silicates having a satisfactory rate of solution. For rapid solubility such silicates must contain an appreciable quantity of water of hydration. In the prior art silicates of this type have generally been produced by spray drying silicate solutions in such fashion as to only partially dehydrate them. These solutions have also been partially dehydrated by passage through various types of furnaces wherein their excess water has been removed by contact with heated surfaces. The spray dried materials are expensive owing to the high cost of spray drying equipment. They are usually too dusty to be readily handled; they have low apparent specific gravities and they have a tendency to become less soluble upon aging. And the partially hydrated products produced by furnacing methods have been non-uniform and imperfectly soluble. The present invention affords a more advantageous method of producing silicates of the type described.

We have found that concentrated solutions of the more siliceous alkali metal silicates, which for convenience will be called water glasses, can be dehydrated readily by contact with various dehydrating liquors which are capable of extracting excess water to produce shaped particles of various sizes and shapes. This result can be accomplished by introducing the water glasses in the form of drops or other shaped bodies into a body of the dehydrating liquor. If the latter is properly chosen it will extract water from the surfaces of the shaped bodies of the water glasses, rapidly forming a tough and somewhat impervious skin coating.

The water-glass is apparently gelatinized where it contacts with the dehydrating liquor and the gel coating thus produced acts as a semipermeable membrane through which additional water can be extracted from the interior of the particles by the action of osmosis. When sufficient water has been extracted, the shaped bodies of water glass become solidified, usually without substantially changing their original shape and the outer layers, which are more completely dehydrated and harder than the body of the particles, possess a substantial mechanical strength. These outer layers are usually somewhat more slowly soluble and less pervious than the inner layers. This may be explained by the fact that the dehydrating liquids usually remove some alkali metal oxide from the droplets so that their surfaces become more siliceous than their interiors. The outer layers are less hydrous than the interior of the particles, at least when the particles are freshly made. During storage the water content tends to become equal throughout the particles. The character of the outer layers can be varied in order to provide a delayed or predetermined rate of solubility. Products can be made in which this impervious outer skin is very thin, the particles as a whole containing a substantial amount of water. Particles of this type dissolve at a rate considerably above any which can be obtained by the use of methods used previously in this art. On the other hand icles having a thick, impervious, outer layer be produced having a substantially lower of solubility.

he character of the outer layer produced on shaped particles of this invention depends n the dehydrating liquor used, the length of e the silicate particles remain in contact with dehydrating liquor, also upon the dehydrat- power of the latter, the temperature, the o of alkali metal oxide to $SiO_2$, etc. But ie factors can be readily controlled in such iner as to produce products having practi- y any rate of solubility which may be desired ndustrial use.

he dehydrating solutions employed in the ient invention may be either organic or in- inic. Concentrated aqueous solutions of most trolytes are effective for this purpose, due al- ance being made for the possibility of un- orable chemical reaction with the alkali metal ate. Strongly alkaline solutions such as ium hydroxide may fail to coagulate the olets. Strongly acid solutions, on the other d, may neutralize sufficient of the alkali in alkali metal silicate solution to result in a l particle of too low solubility. Solutions of vy metal or alkaline earth metal salts, on the er hand, usually react metathetically at the ace of the droplets to form insoluble metal ates. Any one or more of these reactions may lesirable to a degree in any given case in or- to control the time or rate of solution of the shed particles. The concentration and kind lectrolyte chosen will be determined by the ilt desired. In general, a solution of a neutral of an alkali metal will result in a product ise composition is close to that of the original ili metal silicate solution, except for some ydration, and which will have a rate of so- on consistent with its alkali metal oxide to 2 to $H_2O$ ratio. Concentrated solutions of trolytes which are substantially neutral in tion and which do not react metathetically a alkali metal silicate solutions usually pro- e products which are most widely useful.

Te have employed aqueous solutions of sodi- carbonate, sodium nitrate, sodium chloride ammonium hydroxide as dehydrating ors, for example, with particularly favorable ilts. The dehydrating liquors of this inven- t can be defined as liquors capable of pro- ing a gelatinous or curdy precipitate when ater glass is added thereto and which have iotic pressures substantially higher than that he water glass to be dehydrated. The latter perty appears to be essential in order that the er in the water glass may pass into the de- rating liquor through the semi-permeable gel ting which is initially formed on the particles ater glass. Organic dehydrating liquors, such ethyl and methyl alcohols, acetone, etc. are ) effective. Best results are obtained if the ydrating liquor is miscible with water but stantially immiscible with the water glass. iously water must be soluble in this liquor.

Then a potassium water glass is to be dehy- ted with an electrolyte solution it is usually advantage, of course, to employ a potassium ; as a dehydrating liquor in order to avoid tamination with sodium. It is generally ad- tageous to employ dehydrating liquors which duce no decomposition of the water glass al- ugh in certain cases a certain amount of de- iposition may be desirable. For example, if s desired to produce a dehydrated mixed sili- cate it is possible to employ as a dehydrating liquor the salt of a metal other than that pres- ent in the silicate which is to be dehydrated. The metal of the dehydrating liquor then replaces the metal of the silicate to some extent in the outer layers of the resulting shaped particles. In this way the solubility of these outer layers can be controlled with considerable accuracy. If a potassium salt is used to dehydrate a sodium sili- cate water glass, for example, the outer layer produced will contain some potassium silicate which is slightly more soluble than a sodium sili- cate of similar composition. On the other hand less soluble silicates can be introduced into the outer layers by using a solution of a heavy-metal or alkaline earth metal salt. We have found that most dehydrating liquors, for example am- monium hydroxide, ammonium chloride, disodi- um phosphate and certain bi- or acid salts, re- move alkali from the outer layers leaving this more highly siliceous, with the result that the shaped particles have a delayed and predeter- mined rate of solubility. This is an important advantage in certain cement compositions in which it is desired that other ingredients go into solution and/or enter into chemical reaction be- fore the silicate is dissolved.

The water glass to be dehydrated may be in- troduced into the dehydrating liquor in various ways. It may be added drop-wise by spraying it or by dropping it from trays or tubes provided with tips of various sizes and shapes. Or it may be extruded into the liquor to produce threads, rods, sheets or vermicular shapes. It is also possible to pass the water glass into the dehy- drating liquor in the form of films by passing it into the liquor as a coating on a rotating drum or on a continuous belt, for example. The result- ing dehydrated films can be removed by scrapers and then flaked, if desired. It is also possible to disperse the water glass particles in the dehy- drating liquor by suitable agitation. For exam- ple the water glass and the dehydrating liquor can be introduced into a vessel in the form of superimposed layers, followed by agitation, or the water glass can be introduced into an agi- tated bath of dehydrating liquor either from above or below.

Our process adapts itself readily to contin- uous operation. For example, it is possible to continuously spray the water glass solution to be dehydrated into a bath of dehydrating liquor, the dehydrated particles being continuously re- moved by means of a rake or by means of a belt conveyor which moves along the bottom of the bath. Fresh dehydrating liquor can be con- tinuously passed through the bath, the spent liq- uor being revivified in a separate operation. The dehydrating liquor can be passed either in coun- ter-current or in parallel flow with the particles of water glass.

The final degree of dehydration obtained in our process depends upon the concentration of the water glass, the character of the dehydrating liquor, the temperature, the size of the particles, the ratio of $SiO_2$ to alkali metal oxide and the time of immersion in the liquor. The particles may be permitted to remain in the dehydrating liquor until they have reached the desired de- gree of dehydration or they may be removed at an earlier stage, the drying being completed by exposure to air or by other means.

The dehydrating step is usually conducted at ordinary room temperatures although, if de- sired, lower or higher temperatures may be employed. The use of room temperatures, of course, is usually more economical.

Our process is most useful in the production of dehydrated silicates in which the ratio of $SiO_2$ to alkali metal oxide is not substantially below 2:1. The method becomes inoperative when ratios somewhat lower than this are employed owing first, to the difficulty of extracting water if concentrated silicate solutions are used and second, to the fact that, if more dilute silicate solutions are used, the partially dehydrated particles which are formed in conducting the process retain their fluidity. The higher the ratio of $SiO_2$ to alkali metal oxide, the more rapid the dehydrating action of the dehydrating liquors and the greater the quantity of product which may be produced by means of a given quantity of dehydrating liquor. Best results are obtained in my process with water glasses in which the ratio of $SiO_2$ to alkali metal oxide is 3:1 or above.

For the production of particles of certain shapes it is advantageous to employ a supernatant inert liquid on top of the dehydrating liquor and to introduce the silicate solution into the inert liquid. The inert liquid breaks the fall of the silicate particles and the latter then enter the dehydrating liquor at a low velocity. We usually employ an organic liquid, such as petroleum ether or kerosene as an inert supernatant liquor.

In various tests we have been able to make silicate particles of widely varying shapes. Thus we have wound it relatively easy to make blobular shapes or pear shaped particles but more difficult to make particles in the shapes of rings, dumbbells, discs, rods, vermicelli and bowls. The shape and size of the water glass particles at the moment of their introduction into the dehydrating liquor usually determines the shape and size of the dehydrated particles. The size of the latter can be varied from particles having a diameter of about 5 mm. to particles passing a screen of 100 meshes per inch. Products with particle size of 50 mesh (0.3 mm. diameter) or larger have some advantages over those of smaller particle size and can be readily produced by our process. The shape of the dehydrated particles can be varied by regulating the relative specific gravities of the water glass and of the dehydrating liquor, the viscosities of these liquids, the temperature, the distance through which the particles fall, the size and shape of the orifice through which the water glass is passed and the character of the supernatant liquor which may be employed on top of the dehydrating liquor.

In our process it is usually of advantage to employ the concentrated water glasses which are commonly sold as articles of commerce. These solutions are readily available and can be prepared by the dissolution of alkali metal silicate glasses in water without the necessity of evaporation. In some cases more dilute water glasses should be employed, for example, when a lower viscosity is required for effective atomization or when it is desired to mix or dissolve some other substance in the water glass before its dehydration.

The product of this invention is particularly useful in detergency, for example, in the washing of clothes, dishes and food handling equipment. For many purposes the partially dehydrated water glass can be used effectively without any additions. For certain purposes, however, it is desirable to use a product comprising a mixture of water glass with another compatible detergent alkali such as sodium carbonate, tri-sodium phosphate, sodium pyrophosphate, sodium tetra-phosphate, sodium hexameta phosphate, various soaps, etc. We have found that such mixtures can be easily prepared by our method.

The procedure in making such products is to form an intimate mixture of the desired addition agent with the water glass. This may be accomplished by simply mixing and/or grinding the addition agent with the water glass. In some cases it may be necessary to add a small amount of water in order to maintain the mixture in a fluid condition. In some cases the added material will dissolve completely, but usually the mixture will comprise a suspension containing at least part of the added material undissolved. In any case the prepared fluid mixture can be added dropwise to the coagulating and dehydrating liquid in the same manner as that already described.

It will be readily apparent from the prior description that our process has many important advantages. Our product can be employed in all industrial applications in which quickly soluble silicates are useful which have a composition containing two molecules or more of silica to one molecule of alkali metal oxide. Examples of these are adhesives, refractory cements, fireproofing, paper sizing, the production of protective and preservative coatings and, more particularly detergent operations. Our product can be ground if desired or it can be converted into the so-called intumescent form by quickly heating the particles to temperatures ranging from about 300° to 400° C. But for most purposes the product is sold and shipped in the form of shaped particles which have been dehydrated and then usually air dried to the desired water content. In this form the product is completely free from troublesome dust. The product may weigh as much as 55 pounds or more per cubic foot so that packaging and storage are very economical. The rate of solution of the particles can be adapted to the particular purpose for which they are to be used. Thus, articles can be produced which have a rate of solubility which is very low initially, while the outer layer is dissolving, said rate then becoming substantially increased. In addition our method has the advantage of heat economy for the reason that it is necessary to apply heat only in the recovery or revivification of the dehydrating liquor. This liquor is usually of the type which can be dehydrated much more readily than the water glass solutions. Spent organic dehydrating liquors can be revivified by distillation. In any case a direct and economical utilization of heat can be achieved.

Our invention is illustrated in the accompanying drawing which shows, more or less diagrammatically, an assembly of apparatus elements which can be used, within the purview of the present invention, to conduct our process, and which also shows several of the shaped particles which can be produced by this invention. In this showing:

Fig. 1 is a perspective showing of several particles of our hydrous alkali metal silicate product, while Fig. 2 is a diagrammatic showing of one method by which our process can be conducted.

The drawing is provided with descriptive legends which are believed to make it self explanatory. A tray 1 containing a water glass solu- 2 is shown, this tray having a perforated
al bottom 3. The water glass solution in-
luced into this tray falls in the form of drops
a dehydrating tank 4 which contains a de-
rating liquor 5. A supernatant inert liquid
employed above the dehydrating liquor. As
water glass drops strike the inert liquid in
tank their fall is broken and hence they
r the dehydrating liquor at a low velocity
without distortion of their form. The de-
rating liquor produces coagulation and de-
ration of the surface layers of the water glass
icles, the particles acquiring sufficient rigid-
o prevent their deformation by the time they
e the endless belt 7 which may be passed
ugh the dehydrating liquor either continu-
y or intermittently. The partially dehy-
ed particles collect on the endless belt and
me further dehydrated as they pass through
tank. By the time the particles are lifted
n the bath by means of the belt they are
ciently rigid to be handled without damage.
belt can be passed through a drying oven,
shown, if desired or the particles can be re-
ed from the belt and centrifuged or allowed
ir dry before being packed.
ur invention can be further described by ref-
ice to the following examples of methods with-
he scope of this invention which have been
l in actual practice in manufacturing the
lucts of this invention.

*Example 1*

)0 parts of a silicate of soda solution con-
ing 8.5 per cent $Na_2O$ and 28.7 per cent $SiO_2$
e dropped from a glass tip into about 500
;s of a 40 per cent solution of sodium nitrate.
droplets of liquid congealed in the solution
spherical globules and settled to the bot-
, the product resembling tapioca in appear-
e. After about eighteen hours the globules
e removed, centrifuged and allowed to air
for three and one-half hours. Analysis of
hard translucent globules showed them to
tain 36.23 per cent $SiO_2$ and 10.65 per cent
O.

*Example 2* he experiment described above was repeated
ig the same solutions and quantities except
; the silicate of soda solution employed con-
ed 6.4 per cent $Na_2O$ and 24.7 per cent $SiO_2$.
product obtained after the same immersion
e and the same air drying time was found to
tain 43.25 per cent $SiO_2$ and 10.74 per cent
O.

*Example 3*

)0 parts of a silicate of soda solution con-
ing 6.4 per cent $Na_2O$ and 24.7 per cent $SiO_2$
e allowed to fall dropwise from fine orifices
about 500 parts of a 25 per cent solution of
um chloride or common salt. Upon enter-
the liquid the drops assume a spherical form
settle to the bottom of the container, the
s resembling tapioca in appearance. After
nty hours the solution was removed from the
ules by means of a centrifuge and the
ules were permitted to air dry for twenty-
hours. Chemical analysis of the resulting
luct showed 47.10 per cent $SiO_2$ and 11.84
cent $Na_2O$. A thin film of material on the
ace of the globules failed to go into solution
ably owing to partial carbonation of their
ace layer while in contact with the air. The
globules remained free-flowing when stored in a
glass bottle.

*Example 4*

100 parts of a silicate of soda solution contain-
ing 6.4 per cent $Na_2O$ and 24.7 per cent $SiO_2$ were
dropped from fine orifices into about 500 parts
of an ammonium hydroxide solution having a
specific gravity of 0.90. In this case it was found
advantageous to maintain a layer of petroleum
ether on top of the aqueous solution in order
to break the fall of the droplets and permit them
to assume a globular form before entering the
dehydrating solution. The globules were allowed
to remain immersed for eighteen hours. They
were then centrifuged and permitted to air dry
for twenty-four hours. Examination of the
globules showed that, when immersed in water,
they remained undissolved for some time but
after a while they split spontaneously. From
this point on, they dissolved rapidly but a thin
skin of material retaining the original curvatures
of the exterior of the globules remained in small
pieces as an insoluble residue. This demonstrates
the ability of such an insoluble skin coating to
insure a delayed time of initial entry into solu-
tion of such a product. Chemical examination
showed that 4.83 per cent of the product was
insoluble in cold water and that the soluble por-
tion contained 50.28 per cent $SiO_2$ and 13.81 per
cent $Na_2O$ based on the weight of the sample
taken.

*Example 5*

100 parts of a silicate of soda solution contain-
ing 6.4 per cent $Na_2O$ and 24.7 per cent $SiO_2$ were
added dropwise to about 500 parts of a 39 per
cent solution of $Na_2S_2O_3.5H_2O$. After remaining
immersed for eighteen hours the hard globules
were removed from the solution, centrifuged and
air dried for twenty-four hours. These globules
were found to have a resistant, relatively insol-
uble skin or outer layer comprising 5.7 per cent
of their weight. Analysis of the product showed
it to contain 10.58 per cent $Na_2O$ and 39.75 per
cent $SiO_2$ soluble in cold water.

*Example 6*

100 parts of a silicate of soda solution contain-
ing 6.4 per cent $Na_2O$ and 24.7 per cent $SiO_2$
were added dropwise to about 500 parts of a satu-
rated solution of sodium carbonate. After re-
maining immersed for eighteen hours the glob-
ules were centrifuged and then allowed to air dry
for twenty-four hours. The product was found
to contain 10.06 per cent of material in the form
of a resistant skin which did not dissolve in
water but successfully brought about a delayed
initiation of solution of the globules in water.
The product contained 16.05 per cent $Na_2O$ and
36.74 per cent $SiO_2$ soluble in cold water.

*Example 7*

884 parts of a silicate of soda solution carry-
ing 6.4 per cent $Na_2O$ and 24.7 per cent $SiO_2$
were added dropwise to about 400 parts of 90 per
cent methyl alcohol. After forty-eight hours im-
mersion the globules were centrifuged and al-
lowed to air dry for twenty-four hours yielding
397 parts of material and representing a recov-
ery of 98.6 per cent of the solids added to the
original liquid silicate. Apparently 55.1 per cent
of the weight of the original liquid silicate em-
ployed had been removed as water and a calcu-
lation shows that the alcohol had taken up a
weight of water approximately equal to the orig-
inal weight of the alcohol.

*Example 8*

75 parts of a silicate of soda solution having a $SiO_2:Na_2O$ ratio of 3.22 and containing 8.85 per cent $Na_2O$ and 28.7 per cent $SiO_2$ were diluted with 30 parts of water. 25 parts of anhydrous sodium carbonate were then admixed in such a way as to avoid the formation of hard lumps. The resulting mixture was fluid, but fairly viscous. It was added dropwise from a glass tip into methyl alcohol, where the hardened globules were removed from the alcohol and dried in the air for an additional 24 hours. Analysis of this final air dried globular product showed it to contain 35.82 per cent anhydrous sodium carbonate, 29.57 per cent $SiO_2$, 9.29 per cent $Na_2O$ and 24.51 per cent water. The product was 99.2 per cent soluble in hot water and remained stable on storage in a tightly stoppered container.

*Example 9*

75 parts of a silicate of soda solution having a $SiO_2:Na_2O$ ratio of 3.22 and containing 8.85 per cent $Na_2O$ and 28.7 per cent $SiO_2$ were diluted with 7 parts of water. 25 parts of trisodium orthophosphate dodecahydrate ($Na_3PO_4 \cdot 12H_2O$) were then stirred in. This produced a thin cream-like suspension. This suspension was coagulated and partially dehydrated by dropping it into methyl alcohol. The coagulated globules were removed from the alcohol after 24 hours and further dried in the air for 24 hours. The final product comprised hard, dry globules which remained stable when stored in an airtight container. The material was completely soluble in cold water. Chemical analysis showed the product to contain 17.57 per cent $Na_3PO_4$, 30.56 per cent $SiO_2$ and 9.49 per cent $Na_2O$.

*Example 10*

75 parts of a silicate of soda solution having a $SiO_2:Na_2O$ ratio of 3.86 and containing 6.4 per cent $Na_2O$ and 24.7 per cent $SiO_2$ were diluted with 38 parts of water. 25 parts of anhydrous sodium carbonate were then admixed in such a way as to avoid the formation of any lumps. The fluid mixture was then coagulated and partially dehydrated by dropping it into a 25 per cent solution of sodium chloride. After remaining in the salt solution for 90 hours the partially dehydrated globules were removed and further dried in the air, yielding a product comprising hard, dry globules. An examination of this product showed that it was 98.64 per cent soluble in hot water, and that it contained 4.96 per cent $Na_2CO_3$, 44.06 per cent $SiO_2$ and 11.56 per cent $Na_2O$.

*Example 11*

25 parts of anhydrous tetrasodium pyrophosphate were mixed with 50 parts of water. 100 parts of a silicate of soda solution carrying 8.85 per cent $Na_2O$ and 28.7 per cent $SiO_2$ were then mixed in. 155.6 parts of this mixture were added dropwise from a dropping tip to 400 parts of methanol. As the droplets slowly fell through the methanol they assumed a spherical shape and became sufficiently rigid so that they piled upon the bottom of the container without coalescing with each other. After 72 hours the particles were removed, centrifuged and the excess methanol was removed by exposure to the air. A yield of 94.2 parts of hard, solid, white, opaque globules averaging about 2 millimeters in diameter was obtained. These globules were found to be largely soluble in cold water. This product proved to have exceptional value as a detergent.

The mixtures of silicate of soda solution with other detergents, which were employed in the above examples, were found to be particularly well adapted to the formation of a product having particles in the form of vermicules. When these are desired, the mixture is prepared with a smaller amount of water so as to be pasty in consistency, and this mixture is then extruded through suitably shaped orifices so as to form worm-like streams which are coagulated and dehydrated by immersion in the suitable liquids.

While we have described what we consider to be the more advantageous embodiments of our process, it is obvious, of course, that various modifications can be made in the procedures set out without departing from the purview of this invention. For example, while we have mentioned the production of sodium and potassium silicate products only, our method is equally applicable to the production of other alkali metal silicates in the shaped particles of this invention. It is evident from the preceding description that the dehydrating liquors of our invention can be varied widely both in character and in concentration. It is also evident that our process can be conducted under widely varying conditions of temperature, manipulation of the solutions, etc. It is merely necessary to employ some method of distributing the silicate solution in the dehydrating liquor in the form of particles of the desired shape and size. The orifices or tips through which the water glass is passed may be immersed in the dehydrating liquor or in an inert supernatant layer of liquid, or they can be positioned at some distance above the dehydrating bath.

The products within this invention can be defined as dust-free compositions comprising vitreous, substantially non-crystalline or colloidal solid particles of hydrous alkali metal silicates containing not substantially less than 2 moles of $SiO_2$ to 1 mole of alkali metal silicate, said particles having outer layers which usually have a lower alkali metal oxide to silica-ratio and which contain less water than their inner layer when freshly made, having streamlined shape corresponding to the shapes assumed by one liquid when introduced into a second immiscible liquid of approximately the same specific gravity and having substantially uniform particle sizes ranging up to about 5 mm. in diameter; said particles sometimes containing other compatible detergent salts in admixture and usually having an outer skin coating which has a rate of solution lower than the rate of solution of the inner layers, whereby a predetermined delay in the dissolution of the particles is produced.

It is evident that all types of compatible solid and liquids can be mixed with the water glass solutions before the resulting mixtures are formed into shaped particles by means of this invention. It is also evident that the particle of this invention can be mixed with various solids which may or may not consist of shape particles. Owing to the streamlined shape of our particles they have little tendency to cake in storage and these particles tend to prevent the caking of other products with which they may be mixed. The substantially impervious skin coatings present on the particles of some of our products make these particles substantially inert in spite of the fact that the interior of the par- ...les may be substantially hydrated. Our par-
...les can therefore be used to produce stable
...xtures with chemicals which would normally
...act with previously known hydrous silicates.
...her modifications of the processes described
...rein, which fall within the scope of the follow-
...g claims, will be immediately evident to those
...illed in this art.
What we claim is:
1. In the manufacture of solid particles of
...drous alkali metal silicates in the shape of
...obules, vermicelli, bowls, dumbbells, discs, rings,
...ops, rods, threads, sheets and the like, the
...ocess which comprises introducing liquid par-
...les, having such shapes and consisting of a
...ncentrated aqueous alkali metal silicate solu-
...on containing not substantially less than 2
...olecules of $SiO_2$ to 1 molecule of alkali metal
...ide, under substantially quiescent conditions
to a dehydrating liquor, capable of producing
... gelatinous precipitate upon being mixed with
...id silicate solution, thereby producing the par-
...al dehydration of said shaped particles without
...bstantial solution thereof, and separating the
...sulting hydrous silicate particles, having such
...apes from said dehydrating liquor.
2. The process of claim 1 wherein said dehy-
...ating liquor is a concentrated aqueous solu-
...on of an electrolyte in which said alkali metal
...icate solution is substantially insoluble and
...ving an osmotic pressure greater than that of
...id water-glass.
3. The process of claim 1 in which said de-
...drating liquor is an organic liquid in which
...ater is soluble but said water glass is substan-
...lly insoluble.
4. In the manufacture of shaped particles
...mprising hydrous sodium silicates, the process
...hich comprises adding a concentrated aqueous
...lution of a sodium silicate, containing at least
... molecules of $SiO_2$ to 1 molecule of $Na_2O$, in a
...opwise manner, under substantially quiescent
...nditions, to a dehydrating bath comprising a
...ncentrated aqueous solution of an electrolyte
...ving an osmotic pressure greater than that of
...id silicate solution, thereby coagulating and
...hydrating the outer layers of the drops of said
...icate solution without substantial solution
...ereof and without substantial deformation of
...id drops, said dehydrating bath containing an
...ert liquid layer above said electrolyte solution,
...d separating the resulting shaped particles
...om said bath.
5. The process which comprises adding a water
...ass dropwise to a dehydrating bath comprising
... dehydrating liquor having the characteristic
...operty of producing a gelatinous precipitate
...hen mixed with said water glass, thereby coag-
...ating and dehydrating the surface layers of
...e drops as they pass through said bath without
...bstantial solution thereof, removing spent bath
...uor, dehydrating said spent liquor and rein-
...oducing it into said bath, and removing the
...sulting shaped particles of partially dehydrated
...ater glass from said bath, said water glass con-
...ining not substantially less than 2 molecules
...f $SiO_2$ to each molecule of alkali metal oxide.
6. In the manufacture of solid particles of
...drous alkali metal silicates in the shape of
...obules, vermicelli, bowls, dumbbells, discs, rings,
...ops, rods, threads, sheets and the like, the
...ocess which comprises mixing a solid alkaline
...mpatible detergent compound with a water
...ass containing at least about 2 molecules of
...$O_2$ to 1 molecule of alkali metal oxide in pro-
portions forming a liquid mixture, passing said
liquid mixture into a dehydrating bath under
substantially quiescent conditions in the form of
liquid particles having such shapes, said dehy-
drating bath having the characteristic property
of producing a gelatinous precipitate upon being
mixed with said water glass, thereby coagulating
and dehydrating the surface layer of said par-
ticles upon passage through said bath without
substantially dissolving or disintegrating the
same, and removing the resulting shaped par-
ticles from said bath.

7. The process which comprises dropping water
glass containing at least 2 molecules of $SiO_2$ to 1
molecule of alkali metal oxide into a concen-
trated aqueous solution of an alkali metal salt
producing a gelatinous or curdy precipitate when
said water glass is added thereto and having an
osmotic pressure higher than that of said water
glass, under substantially quiescent conditions,
thereby coagulating and dehydrating the surface
layers of said drops as they pass through said so-
lution, separating the resulting partially dehy-
drated droplets or water glass from said salt solu-
tion, and drying said droplets to the desired
water content.

8. The process which comprises spraying a
water glass containing at least 2 molecules of
$SiO_2$ to 1 molecule of $Na_2O$ into a dehydrating
bath comprising a concentrated aqueous elec-
trolyte having the characteristic property of
producing a gelatinous precipitate upon being
mixed with said water glass, thereby coagulating
and dehydrating said water glass particles with-
out substantially dissolving the same, said elec-
trolyte having an osmotic pressure greater than
that of said water glass, and separating the re-
sulting partially dehydrated water glass globules
from said dehydrating bath.

9. The process which comprises mixing an
alkaline compatible detergent compound with a
concentrated, aqueous sodium silicate solution
containing at least 2 molecules of $SiO_2$ to 1 mole-
cule of $Na_2O$, extruding said mixture into a de-
hydrating bath comprising a concentrated aque-
ous electrolyte having the characteristic prop-
erty of producing a gelatinous precipitate upon
being mixed with said water glass and having
an osmotic pressure greater than said silicate
solution, thereby coagulating and dehydrating
said solution without substantially dissolving the
same, and removing the resulting partially de-
hydrated and shaped particles from said dehy-
drating bath.

10. New compositions of matter comprising
solid particles of a hydrous alkali metal silicate
in the shape of globules, vermicelli, bowls, dumb-
bells, discs, rings, drops, rods, threads, sheets and
the like, said shapes resulting from the addition
of particles of a water glass having said shapes
to a dehydrating liquor under substantially
quiescent conditions, said dehydrating liquor be-
ing one having the characteristic property of
producing a gelatinous precipitate when mixed
with said water glass and having an osmotic
pressure higher than that of said water glass,
the resulting solid particles being substantially
uniform in size, having diameters ranging up to
about 5 mm., being substantially non-crystalline,
containing water and not substantially less than
2 molecules of $SiO_2$ to 1 molecule of alkali metal
oxide and having an outer layer more siliceous
than the interior of said particles.

11. New compositions of matter comprising
solid particles containing a hydrous alkali metal silicate and an alkaline compatible detergent compound in intimate admixture, the said hydrous silicate containing water and not substantially less than about 2 molecules of $SiO_2$ to 1 molecule of alkali metal oxide, said particles bearing an outer layer which is less hydrous than the interior when said particles are freshly made and which contains a lower alkali metal oxide : silica ratio than the interior of said particles; said particles being in the shape of globules, vermicelli, bowls, dumbbells, discs, rings, drops, rods, threads, sheets and the like, said shapes resulting from the introducing of discrete particles of a mixture of a concentrated, aqueous alkali metal silicate solution and said detergent compound having said shapes into a dehydrating bath under substantially quiescent conditions said dehydrating bath having the characteristi property of producing a gelatinous precipitat when mixed with said silicate solution and hav ing an osmotic pressure higher than that of sai silicate solution.

12. The composition of claim 11 wherein sai detergent compound is sodium carbonate.

13. The composition of claim 11 wherein sai detergent compound is tetrasodium pyrophos phate.

14. The composition of claim 11 wherein sai detergent compound is trisodium orthophosphat

CHESTER L. BAKER.
CHARLES H. DEDRICK.